United States Patent [19] [11] 3,772,118
Walter [45] Nov. 13, 1973

[54] CONTINUOUS PRODUCTION MACHINE FOR THE MANUFACTURE OF A COMPOSITE TUBULAR ELEMENT

[75] Inventor: Jean-Jacques Walter, Boulogne, France

[73] Assignee: Agence Nationale De Valorisation De La Recherche Anvar, Neuilly-sur-Seine, France

[22] Filed: Dec. 8, 1971

[21] Appl. No.: 205,862

[30] Foreign Application Priority Data
Dec. 11, 1970 France ............................. 7044648
July 15, 1971 France ............................. 7125943

[52] U.S. Cl. ................. 156/172, 156/187, 156/191, 156/229, 156/244
[51] Int. Cl. ............................................ B31c 13/00
[58] Field of Search ............... 156/392, 432, 165, 156/185, 499, 500, 501, 428, 213, 272, 547, 156/430, 143, 187; 425/109, 112, 113

[56] References Cited
UNITED STATES PATENTS
3,503,828  3/1970  Walter .............................. 156/500
3,486,196  12/1969  Klenk et al. ....................... 156/501

Primary Examiner—Douglas J. Drummond
Assistant Examiner—Frank Frisenda
Attorney—William B. Kerkam, Jr.

[57] ABSTRACT

A reinforcement jacket surrounding a leak-tight inner sheath of plastic material is impregnated with a hardenable binder while at the same time forming an outer sheath of plastic material which applies the binder intimately and uniformly against the reinforcement jacket and then polymerizing the binder.

Successive operations performed by a continuous production machine comprise the continuous fabrication of an inner sheath of plastic material which is displaced over a mandrel and given a tubular shape, impregnation of the reinforcement material with a hardenable binder followed by polymerization of the binder. An outer sheath of plastic material surrounding the inner sheath and jacket is supplied continuously by an extruder and subjected to elongation at the outlet of this latter, thereby causing radial shrinkage of said outer sheath onto the jacket of the inner sheath.

16 Claims, 12 Drawing Figures

Patented Nov. 13, 1973

CONTINUOUS PRODUCTION MACHINE FOR THE MANUFACTURE OF A COMPOSITE TUBULAR ELEMENT

This invention relates to a method for the continuous manufacture of a tubular element constituted by a thin and leak-tight inner sheath of plastic material which is obtained especially by extrusion, by an intermediate high-strength covering or jacket formed by one or a number of windings of threads, braids or ribbons, especially of glass fibers impregnated with a hardenable binder, this jacket being intended to form an external reinforcement band for the inner sheath, and by a thin and leak-tight outer sheath which may be of the same material as the inner sheath or of different material and tightly surrounds the intermediate jacket so as to improve the abrasion resistance of the tubular element and to protect this latter from the surrounding atmosphere.

There are already known a number of different methods and machines for the manufacture of tubular elements of this type which are made both resistant and leak-tight by the combination of a thin inner sheath and in some cases by an outer sheath with an intermediate reinforcement or banding jacket of glass fibers impregnated with a polyester or epoxy resin. In particular, it has already been proposed to carry out the continuous manufacture of the inner plastic sheath by means of an extruder of known type which is provided at its outlet with a cylindrical mandrel, at least part of which ensures calibration of the sheath whose internal diameter is thus made equal to the external diameter of the mandrel, and with traction means adapted to draw the sheath axially over the mandrel.

In order to provide the thin inner sheath which is obtained as it passes through the machine with a tubular shape which makes it possible to carry out subsequent operations and in particular the winding of threads or ribbons of glass fibers of the banding jacket, it has also been proposed in this earlier patent to admit a fluid under pressure, usually compressed air, along the axis of the mandrel progressively as the sheath is delivered from the extruder. In order to maintain this pressure and to confer a sufficient degree of rigidity on the sheath, this latter is provided at that end which is delivered from the machine or downstream end with at least one sealing plug constituted preferably by a flexible and elastic diaphragm which is inflated and covered with elements having a low coefficient of friction and especially "Teflon," this plug being maintained in position with respect to the mandrel and being intended to permit the inner sheath to slide over its periphery without damaging its surface.

During its travel through the machine, the inner sheath can accordingly be covered with one or a number of layers of glass fibers, the components of which (threads or ribbons) have given orientations with respect to the axis of the sheath, these threads or ribbons being then impregnated by means of spray tubes or by passing through a tank with a plastic material either of the thermosetting or thermoplastic type which forms a binder and serves to form a particularly strong reinforcement covering or so-called banding jacket on the outer surface of the sheath ; in particular, when the binder is constituted by a polyester or epoxy resin, polymerization of this latter is caused by passing the inner sheath and its external jacket through a suitable heating furnace of the infrared radiation or high-frequency type.

In a final operation which can take place after impregnation of the jacket but before polymerization of the binder, the tubular element is covered with an outer protective sheath which is wound or extruded directly on the banding jacket of the inner sheath.

The object of this invention is to provide improvements in the methods and machines for manufacturing tubular elements of the type referred-to above, which permit a considerable improvement in the properties of the final product while reducing the cost price to a very appreciable extent, the method of operation being more straightforward and the machine being less complex, thereby enhancing reliability and limiting maintenance.

To this end, the method under consideration mainly consists, on an inner sheath of leak-tight plastic material surrounded by a jacket constituted by one or a number of windings of reinforcement material, in effecting simultaneously the impregnation of said reinforcement material with a hardenable binder and the formation of an outer sheath of plastic material which applies the binder intimately and uniformly against the reinforcement material, then in polymerizing the impregnating binder.

In accordance with a particular feature of the method, the imregnating material is polymerized at a relatively low temperature by means of ultraviolet radiation.

In a first alternative mode of execution, the outer sheath is formed by continuous extrusion and subjected to limited elongation combined with supporting by means of air cushions in order to apply said sheath against the reinforcement material and to produce penetration of the binder into said material, whereupon said sheath is cooled after elongation in such manner as to cause radial shrinkage. Preferably, the penetration of the binder and the application of the outer sheath against the reinforcement material are completed by applying on said sheath radial calibration forces which are uniformly distributed at its periphery. In another alternative mode of operation, a uniformly distributed hydrostatic pressure is applied on the outer sheath.

The simultaneous performance, in accordance with the method of the invention, of the impregnation of the reinforcement material which constitutes the jacket of the inner sheath and of the fabrication of the outer sheath has the essential advantage of producing a wholly homogeneous and uniform distribution and penetration of the binder between the fibers of the threads or ribbons of the reinforcement jacket which have previously been wound in the dry state on the inner sheath. Subsequent hardening of this binder accordingly takes place through the entire thickness of the reinforcement material while forming together with this latter an external banding element which has a perfectly distributed mechanical resistance, thereby limiting considerably, in conjunction with the inner and outer sheaths, any danger of local fracture of the tubular element under the action of various stresses.

Finally, the method according to the invention prevents any break in continuity in the positioning of the outer sheath on the impregnated reinforcement material, thereby removing any possibility of loss of the binder which cannot fall since it is continuously supported and confined within the outer sheath.

The materials employed for the fabrication of the inner and outer sheaths can be of essentially variable nature and either identical or different in the case of the two sheaths, depending on requirements; in particular, these sheaths can be formed of high or low-density polyethylene, of acrylonitrile butadiene styrene, of polyvinyl chloride, of polystyrene, of polypropylene and so forth. The impregnating binder of the reinforcement jacket can be constituted by any thermosetting or thermoplastic material and especially by a polyester or epoxy resin which may if necessary be catalyzed and accelerated.

This invention is also concerned with a machine for carrying out the above-mentioned method, comprising successively in the direction of formation of a tubular element from the upstream to the downstream end, means for the continuous manufacture of an inner sheath of plastic material which are associated with a mandrel for giving a tubular shape to said sheath, means for displacing said inner sheath over the mandrel, means for covering the sheath in the dry state with at least one winding of threads or ribbons formed of reinforcement material, means for impregnating the reinforcement material with a hardenable binder and means for polymerizing said binder which are located downstream of the impregnating means, characterized in that the impregnating means are constituted by a double-walled tank traversed axially by the inner sheath which is covered with its windings of reinforcement material and comprising an axial cylindrical extension directed towards the upstream end which surrounds the inner sheath coaxially with a clearance space and is provided with a pipe for the admission of the impregnating binder, said tank being mounted at the center and in the axis of an extruder which continuously supplies an outer sheath of plastic material surrounding the inner sheath and its windings of reinforcement material, said machine comprising means for causing elongation of the outer sheath in the hot state which are mounted downstream at the outlet of the extruder in cooperating relation with an axial cylindrical extension of the tank which is directed towards the downstream end and on which the outer sheath slides, means for supporting the outer sheath while causing the radial shrinkage thereof, means for continuing the progressive radial clamping of the outer sheath against the inner sheath and means for completing the uniform distribution and penetration of the impregnating binder through the windings of the reinforcement material.

Further properties of the present invention will become apparent from the following description of one example of construction of the machine under consideration, this example being naturally given by way of indication and not in any limiting sense, reference being made to the accompanying drawings, in which.

Figure 1:
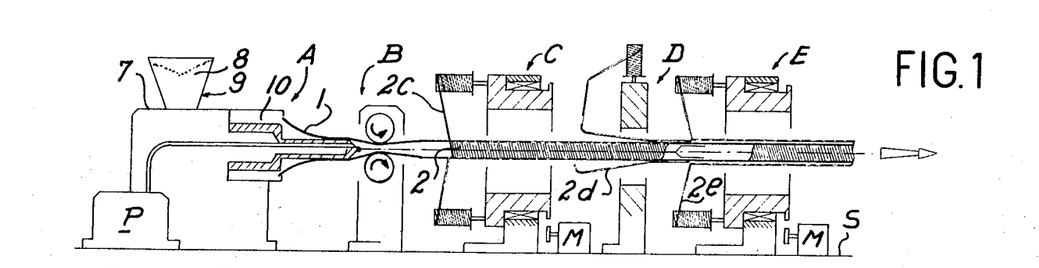
FIGS. 1, 2 and 3 are diagrammatic views of three successive portions of the machine illustrating the different stages of execution of the method of fabrication of a tubular element.
Figure 2:
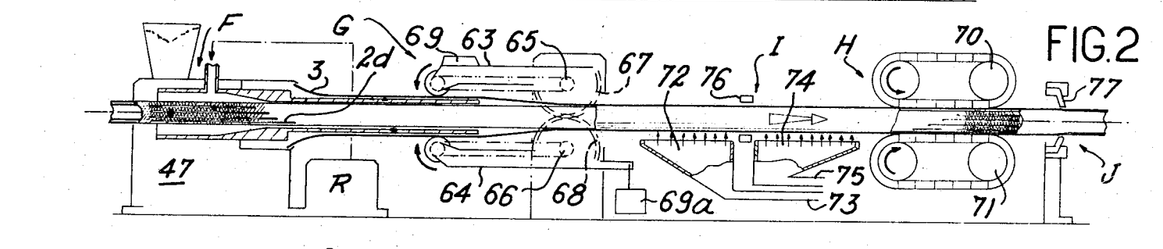
Figure 3:
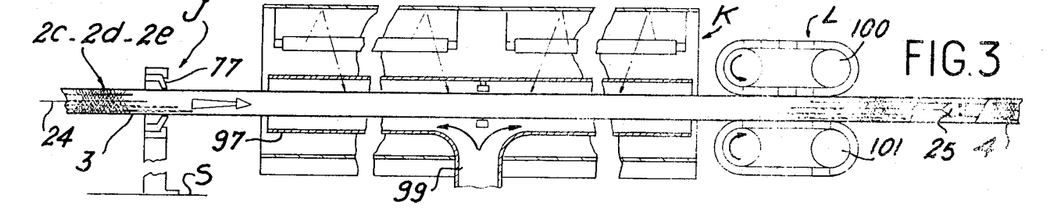

The machine which is illustrated diagrammatically as a whole in FIGS. 1, 2 and 3 is primarily intended for the continuous fabrication of a tubular element 4 constituted by a thin and leak-tight inner sheath 1 of synthetic plastic material, by an intermediate jacket 2 which is intended to constitute a high-strength external banding element and finally by an outer sheath 3 of plastic material which can be of the same kind or different from the inner sheath.

This machine is made up of a series of separate but successive stations which are designated in FIGS. 1 to 3 by the references A to L, each of these stations being intended to carry out a precise and well-determined operation on a portion of the tubular element 4 progressively as this latter follows its path of travel within the machine. The machine rests on a horizontal bed S, the three portions illustrated in FIGS. 1, 2 and 3 being successive and placed one after the other in the order of these figures. The tubular element 4 which is delivered from the last station of the machine is continuously displaced from the left towards the right. Under these conditions, the station A is the farthest upstream and the station L is the farthest downstream. The machine is supported on rails or the like (not shown) which are fixed on the bed S and is driven from one or a number of motors M, the synchronism of the different operations which are carried out being ensured by means of suitable countershafts and transmission systems or by means of any other suitable expedient.

These operations are briefly as follows : the inner sheath 1 which is shaped and calibrated is fabricated continuously in the first station A, especially by means of an extruder of the conventional right-angle head type, then transferred into the station B in which a movement of traction in the downstream direction is exerted on said sheath. The sheath 1 which may have sufficient inherent rigidity or may be suitably maintained in a tubular shape by a pressure of compressed air if the nature of the sheath so requires, then passes into the stations C, D and E in which it receives in the dry state the covering 2 formed of threads or ribbons of glass fiber, respectively designated by the references 2c, 2d, 2e, which are wound or deposited successively on the sheath. There takes place in station F the impregnation of the jacket 2 with a hardenable binder and especially a resin at the same time as the continuous supply of the outer sheath 3 which surrounds the jacket 2 and distributes the impregnation resin within this latter. In the stations G and H, the sheath 3 undergoes a limited movement of elongation and is thus applied in intimate contact over the entire surface of the jacket 2 ; the station I which is located between the stations G and H serves to subject said sheath during its elongation to a suitable heat treatment and to apply the sheath in a suitable manner against the jacket 2 which covers the inner sheath. In station J, the outer sheath 3 is calibrated externally in order to achieve a further improvement in the distribution and penetration of the binder in the jacket 2 whereas cold polymerization of this binder is carried out in station K. Finally, in station L, the final tubular element 4 is drawn continuously to the exterior of the machine.

The constructional detail of each station mentioned above will now be described with reference also to the other figures of the accompanying drawings by reviewing the different stages of operation of the method according to the invention, from the upstream end towards the downstream end.

Figures 4, 7, 9, 10:
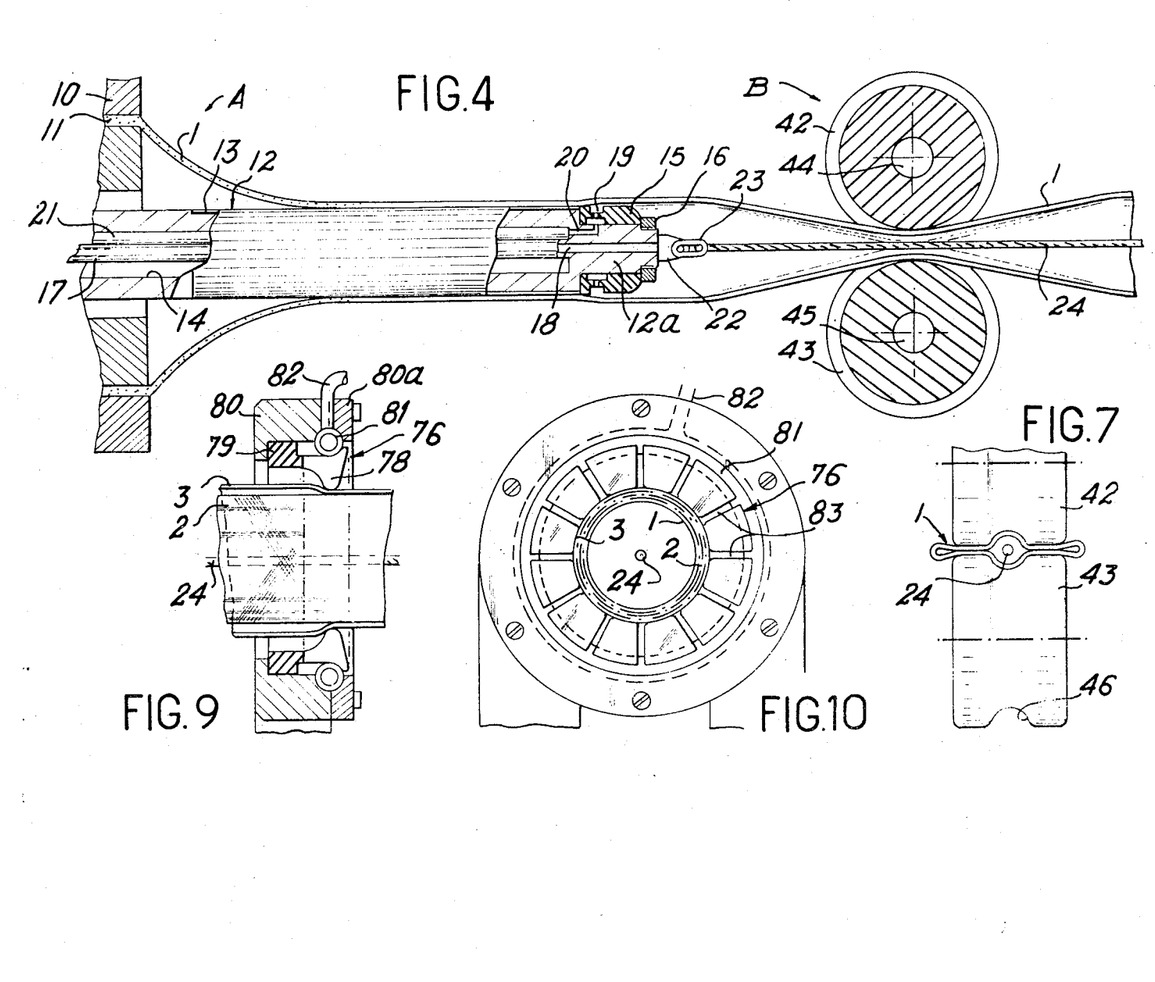
FIG. 4 is a sectional view to a larger scale showing the extruder which permits continuous fabrication of the inner sheath and showing the means for carrying out the displacement of this latter within the machine.
FIG. 7 is a front view of the means employed for displacing the inner sheath within the machine.
FIGS. 9 and 10 are respectively a longitudinal sectional view and a front view of a clamping roller designed to exert on the outer sheath a radial force which is applied to the jacket of the inner sheath.

FIGS. 1 and 4 thus illustrate the essential elements of the first station A which permits continuous fabrication of the inner sheath 1, especially in the case in which this latter does not have a sufficient degree of inherent rigidity and is consequently associated with means for giving the sheath a suitable tubular shape and maintaining this shape while it passes through the machine. Said station A is mainly composed of an extruder for plastics, of a type which is known per se, comprising a frame 7 which contains an endless screw and means for heating the plastic material 8 to a temperature which produces a paste consistency. This plastic material can be polyethylene, for example, and is fed into the extruder, especially in the form of granules, through a hopper 9. The frame 7 terminates in a head 10 into which the plastic material is forced through a narrow annular passageway 11 and consequently appears at the outlet of the extruder in the form of a thin tubular envelope which constitutes the sheath 1.

The extruder referred-to above, which is of the type comprising a so-called right-angle head but the constructional design of which has little bearing on the invention, is associated with a cylindrical mandrel 12. In a first embodiment as illustrated in FIG. 4, the external surface of this mandrel 12 is provided with a covering 13 formed of material having a low coefficient of friction, especially "Teflon" which is deposited by a conventional method. The mandrel 12 is provided along its axis with a bore 14 and supports at that extremity 12a which has a smaller diameter, a steel head ring 15 which is locked against the mandrel by means of a nut 16.

There is mounted in the axis of the bore 14 a pipe 17 which serves to supply through the mandrel 12 to the sheath 1 compressed air at a constant pressure which is appreciably higher than atmospheric pressure and can be chosen between 200 g/cm² and 2 kg/cm², depending in particular on the nature of the sheath. This air pressure is produced by a centrifugal compressor P (shown in FIG. 1) which is located externally of the extruder and has a high delivery which can vary considerably without resulting in too substantial modifications in the value of the pressure which must remain constant. The compressed air which is discharged from the tube 17 passes through the extremity 12a of the mandrel by means of a duct 18 and inflates the sheath 1 on the downstream side progressively as this latter advances at the outlet of the extruder head 10, from which the sheath slides onto the covering 13 of the mandrel 12 and encases this latter, thereby providing said sheet with a constant internal diameter which is substantially equal to the external diameter of said mandrel.

In order to prevent the air pressure from producing the abrupt separation of the sheath upstream of the ring 15 in the region of said sheath which is in contact with the covering 13, the mandrel has a dynamic seal device constituted by a simple channel 19 which is formed at the rear end of the ring 15 and the bottom of which is connected by means of calibrated holes 20 to the annular space 21 which is formed between the bore 14 of the mandrel and the tube 17 and put into direct relation with the atmosphere. Over the entire portion of the mandrel 12 which is surrounded by the covering 13, the sheath 1 is therefore at equal pressure on both faces and slides over said covering in a satisfactory manner while undergoing the desired calibration without impairment of its internal surface which remains wholly smooth and impermeable.

The mandrel 12 is provided at its extremity 12a with a fastening-piece 22 to which a cable eyelet 23 is attached by means of a locking-pin or the like, said eyelet being provided at the end of a cable 24 which extends axially within the interior of the tubular sheath 1 over the entire length of this latter up to the point at which the tubular element passes out of the machine, said cable being secured at the extremity remote from the mandrel 12 to a sealing plug 25 (shown in FIG. 3) which is so designed that the pressure of compressed air within the sheath is continuously maintained in spite of any leakage, on the one hand through the holes 20 of the channel 19 at the upstream end and on the other hand within the residual clearance which is left free between the plug 25 and the internal wall of the tubular element 4, that is to say of the inner sheath 1. The sealing plug 25 is illustrated in detail and to a larger scale in FIGS. 5 and 6.

Figure 5:
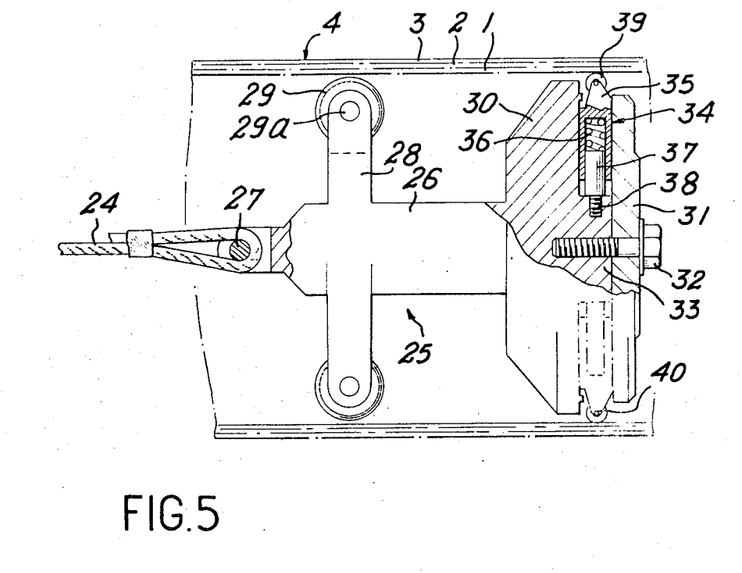
FIGS. 5 and 6 are views to an even larger scale, respectively in longitudinal section and in transverse section, of the sealing plug which is mounted at the extremity of the inner sheath of the tubular element in order that a pressure of compressed air may be established within said sheath.

Said plug mainly comprises an elongated body 26, the upstream extremity of which has a fastening-piece 27 for the corresponding extremity of the cable 24 and a transverse spider 28 which is rigidly fixed to the body 26 and on which runner-wheels 29 are mounted to rotate freely about bearing shafts 29a, said runner-wheels being applied against the internal surface of the tubular element 4 in order to ensure correct centering of the plug within this latter. The body 26 also comprises a head 30 on which is fixed a covering end-plate 31 secured by means of a screw 32 against a cylindrical portion 33 which forms an extension of the head 30 at the forward end.

Between said cylindrical portion 33 and the cover 31, there is formed a space 34 in which is mounted a series of small yokes 35. As shown in plan in FIG. 6, said yokes have the shape of circular sectors having identical angles at the center. Restoring springs 36 are fitted within the yokes 35 and bear on the one hand against the bases of said yokes and on the other hand against stops 37 which form guide pins for said springs, each stop being fixed at 38 in the portion 33 of the head 30.

Figure 6:
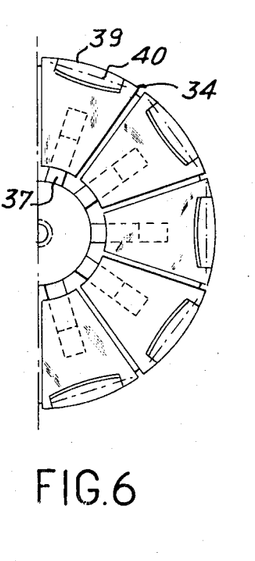

By virtue of the action of the springs 36, the yokes 35 are thus thrust in the radial direction towards the internal surface of the tubular element 4 and apply against this latter rollers 39 which are carried freely by spindles 40 extending along chords of the circular sectors and each having the shape of an elongated olive, thereby enabling said rollers to conform substantially to the contour of the inner sheath 1 while maintaining a sufficient degree of leak-tightness with respect to the pressure of compressed air. It is readily apparent that the rollers 39 are formed of material such that the sheath 1 is capable of sliding over these rollers without any danger of damage to its internal surface which is reinforced externally at this point of the tubular element by the jacket 2 and by the sheath 3.

FIGS. 4 and 7 also illustrate in greater detail the construction of the station B which serves to apply to the sheath 1 as it passes out of the extruder head 10 and is calibrated by the mandrel 12 a suitable tractive force which permits the progressive displacement of said sheath through the other sections of the machine, in conjunction with the drawing action produced by the means of the station L. To this end, the station B is made up of two roller-type wheels 42 and 43 which are rotatably mounted on parallel shafts 44 and 45 at right angles to the axis of the sheath 1 and the spacing of which can be adjusted at will, said wheels 42 and 43 being driven in synchronism and in opposite directions by means of a control motor (not shown in the drawings).

As shown more especially in FIG. 7, each of the above-mentioned wheels is provided in the central portion thereof with a hollow portion 46 forming a groove so that, as a result of suitable spacing of their shafts, said wheels are permitted to pinch the sheath 1 laterally but without completely flattening this latter in order that a sufficient passage may be left in the central portion of the sheath both for inflation with compressed air and for the cable 24 at the extremity of which is mounted the sealing plug 25. The wheels 42 and 43 can be formed in particular of rubber or any light material which is chosen so as to ensure that the lateral flattening of the sheath 1 which is produced by said wheels can always be limited and withstood by the sheath by reason of its natural elasticity.

As has already been stated with reference to FIG. 1, the inner sheath 1 which is formed in the station A and transferred into the station B receives during its transfer through the stations C, D and A an intermediate jacket 2 consisting of threads or ribbons of suitable reinforcement material, especially having a base of glass fibers. After impregnation with a binder and hardening of this latter, the jacket is intended to form a strengthening band having the function of endowing the tubular element 4 with mechanical properties which are impossible to obtain with the inner sheath alone. To this end, the station C comprises a first winding machine of the so-called "Centerless" type or any other kind which may or may not be usually adopted in the technique of winding on a mandrel. There can thus be formed on the sheath 1 which has been made sufficiently rigid by the internal pressure of compressed air a first winding of threads 2c which may if necessary have a given orientation with respect to the axis of the tubular element. In the following station D, the winding 2c is in turn covered with an assembly of longitudinal threads 2d delivered from a creel (not shown) of a type which is also known. Finally, in the third station E, the longitudinal threads 2d are in turn covered with a second winding 2c obtained from a second winding machine which may or may not be identical with the first winding machine of the station C ; the threads of the winding 2d also have a given orientation with respect to the axis of the tubular element but this orientation is preferably opposite to that of the threads of the winding 2c.

Figure 8:
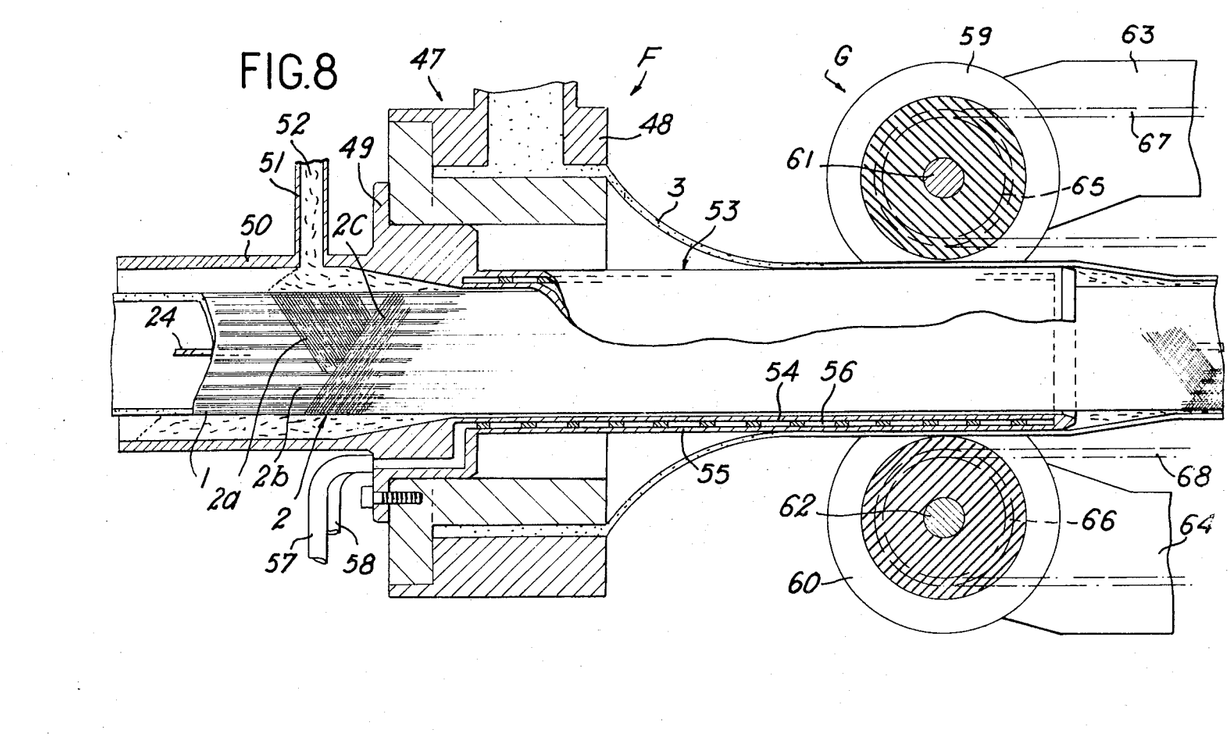
FIG. 8 is a view in elevation of the extruder which permits continuous fabrication of the outer sheath at the same time as impregnation of the banding jacket of the inner sheath with a thermosetting binder.

The sheath 1 which is thus covered with its jacket 2 then passes into the station F, the constructional detail of which is shown on a larger scale in FIG. 8. This station comprises in particular an extruder 47 having a right-angle head 48 which is similar in general structure to the extruder 7 of the station A. This extruder 47 is designed to effect the continuous supply of the outer sheath 3 of plastic material which is intended to cover the jacket 2 of the inner sheath 1 while at the same time producing the impregnation of the threads or ribbons of said jacket with a suitable binder. To this end, the head 48 of the extruder 47 is provided axially on its rear portion with a member 49 having an extension in the form of a cylindrical sleeve 50 which surrounds with substantial clearance both the inner sheath 1 and its jacket 2. A duct joined to said sleeve 50 is connected at the extremity of the extruder 47 to a vessel R (shown in FIG. 2) containing a reserve supply of binder and especially resin 52 which is delivered by a pump (not shown in the drawings) into the duct 51 and from this latter into the sleeve 50 which forms a tank, thus coming into contact with the jacket 2. By virtue of the continuous progression of the tubular element 4 within the machine, and provided that the output of the pump which delivers the resin as well as the clearance left between the sleeve 50 and the jacket 2 are suitably determined, this resin 52 cannot flow towards the upstream end of the sleeve which has the effect, both directly and permanently, of ensuring dynamic leak-tightness of the apparatus as a result of these arrangements.

The member 49 has a further extension, but in the downstream direction, in the form of a second axial sleeve 53 which serves as a guide both for the sheath 3 and for the sheath 1 together with its jacket 2 while separating these latter up to its extremity. The sleeve 53 is constituted by two coaxial casings 54 and 55 between which is arranged a series of passages 56 forming baffles and supplied with a suitable cooling fluid, especially water, which is admitted between the two casings 54 and 55 through a pipe 57 and discharged therefrom through a pipe 58. This circulation of coolant essentially makes it possible to prevent adhesion of the sheath 3 to the axial sleeve 53 while cooling the sheath as it passes out of the extruder and also to ensure that the resin 52 which forms a binder and has been deposited on the jacket 2 but has not yet completely impregnated this latter is isolated from the extruder and protected against overheating. In the alternative form of construction under consideration, the external surface of the sleeve 53 over which the sheath 3 slides is covered with material having a low coefficient of friction such as "Teflon", for example, in the same manner as the external surface of the mandrel 12 of the extruder 7 which delivers the inner sheath 1 (see FIG. 4).

In order to cause the displacement of the outer sheath 3 progressively as the tubular element 4 passes within the interior of the machine, said sheath is clamped within the station G between the external surface of the sleeve 53 which is cooled by the circulation of coolant and two wheels 59 and 60 which are rotatably mounted respectively on two shafts 61 and 62 located at right angles to the axis of the tubular element 4. Said shafts are in turn carried by pivotal levers 63 and 64 which permit their positional adjustment with respect to the sleeve 63. The wheels 59 and 60 are driven by means of pulleys 65 and 66 which are rigidly fixed to the wheels, driving belts 67 and 68 being passed within the grooves of said pulleys.

As is further shown in FIG. 2, the levers 63 and 64 are pivotally mounted on two shafts 65 and 66 parallel to the shafts 61 and 62, and rigidly fixed to two toothed rings 67 and 68 which are disposed respectively in meshing relation in order that the movements of closure or of separation of the wheels 59 and 60 with respect to the sleeve 53 always take place in a wholly symmetrical manner. A ballast-weight 69 and a counter-weight 69a which are rigidly fixed respectively to the levers 63 and 64 serve to adjust the proximity of said wheels while preventing flattening of the sleeve 53 by compression and while making it possible to clamp the sheath 3 against this latter in order to draw it towards the outlet of the extruder 47.

The outer sheath 3 which is thus formed therefore prevents any loss of resin since it covers the jacket 2 of the sheath 1 both completely and permanently but has an internal diameter which is equal to the external diameter of the sleeve 53 and is therefore greater than that of the jacket 2. It is therefore necessary to subject the outer sheath to a limited axial elongation between the stations G and H. To this end, the sheath is drawn into the station H by means of two traction belts 70 and 71 having variable spacing and driven in the appropriate direction at the same speed, which is the speed of transfer of the tubular element within the machine and which is also slightly higher than the speed of the wheels 59 and 60. The sheath 3 which is drawn axially between the wheels and the traction belts has thus a tendency to decrease slightly in diameter and to be tightly applied against the jacket 2 of the inner sheath 1 the surface of said jacket being impregnated with the resin 52 inside the sleeve 50. Moreover, in order that this distribution of resin should be carried out in a wholly uniform and homogeneous manner throughout the thickness of the jacket 2, the outer sheath 3 is subjected within the station I which is located between the stations G and H to a series of successive operations which have the effect of improving the application of the sheath and the penetration of the resin which forms a binder.

In the example described, the station I comprises in accordance with one particular form of construction a first blowing nozzle 72 (shown in FIG. 2) which is supplied with hot air through a duct 73. This nozzle delivers beneath the sheath 3 a hot-air cushion which softens the sheath while supporting this latter from underneath, thereby preventing the formation of resin bulges resulting from the weight of this latter. Provision is made immediately after the nozzle 72 for a second nozzle 74 supplied at 75 with a stream of cold air which also forms a cushion for supporting the sheath and permits incipient cooling of this latter, thereby causing it to shrink radially onto the jacket 2 and the resin 52 which has been deposited on this latter and which, from that time onwards, is progressively but completely driven between the fibers of the windings 2c, 2d, 2e of the jacket 2. There is additionally mounted between the two nozzles 72 and 74 a progressive-clamping collar 76 which exerts on the external sheath 3 a uniform distributed radial force which further improves its application against the jacket 2 while at the same time effecting the guiding of the tubular element 4 progressively as it travels through the machine.

Finally, after passing between the traction belts 70 and 71, said tubular element is subjected within the station J to a further external calibration by means of other collars such as the collar 77 which permit a further improvement in the distribution of the resin between the fibers of the threads or ribbons of the banding jacket.

As is more particularly apparent from FIGS. 9 and 10, the collars 76 and 77 are each constituted especially by a ring 78 of plastic material ("Teflon," polyethylene) carried by a washer 79 which is in turn mounted in a support 80. There is mounted between a flange 80a of said support and the external surface of the ring 78 a tube 81 which forms an inflation chamber of rubber or any suitable elastic material, said tube being connected to a compressed-air supply pipe 82. As shown in FIG. 10, the ring 78 has a series of longitudinal slots 83 which are uniformly spaced around said ring in order to endow this latter with suitable radial flexibility such that, under the effect of inflation of the tube 81, the ring 78 shrinks radially, thereby clamping the outer sheath 3 and applying this latter even more tightly against the jacket 2 of the inner sheet 1. This radial clamping effort which is repeated by a plurality of successive collars having progressive actions produces a perfectly uniform final distribution of the resin 52 which passes between the fibers of the different windings between the two sheaths 1 and 3.

Figure 11:
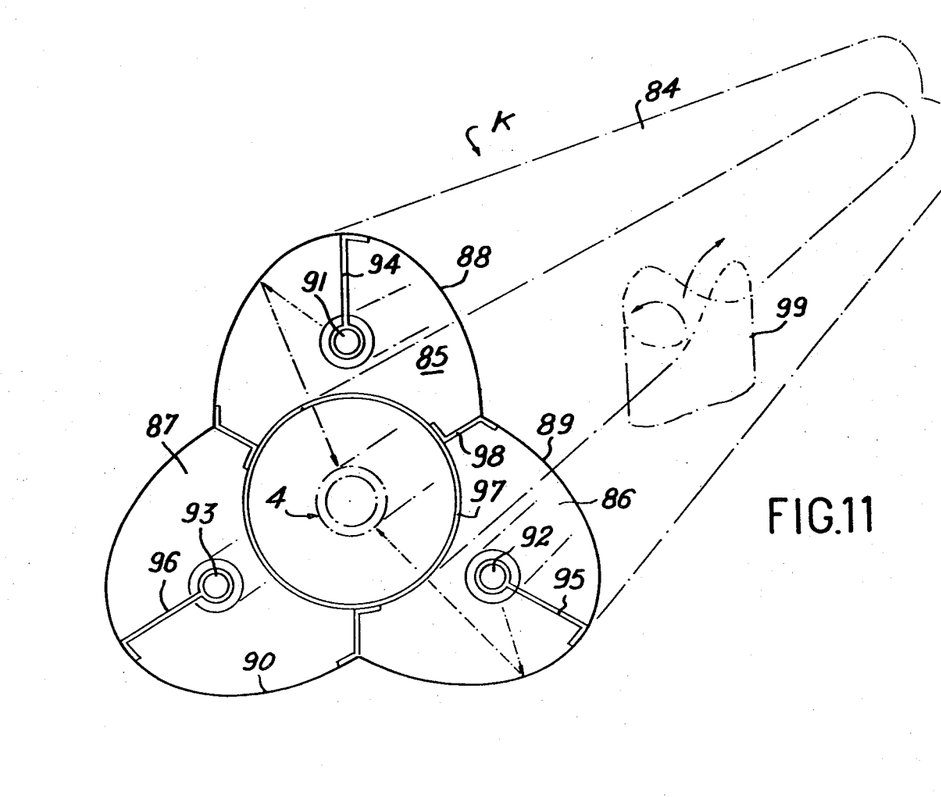
FIG. 11 is a view in partial perspective of the chamber employed for polymerizing the impregnating binder of the reinforcement material which forms the jacket of the inner sheath.

Calibration of the tubular element 4 and impregnation of the jacket being thus completed, the final operation consists in carrying out in the station K the polymerization at a relatively low temperature of the resin which impregnates the jacket 2. Accordingly, as the tubular element follows its path of travel within the machine, it passes through an elongated cylindrical enclosure 84 within which are provided three adjacent compartments 85, 86 and 87 located at angular intervals of 120° with respect to each other about the axis of the enclosure 84. The compartments aforesaid are delimited in the direction of generator-lines parallel to the axis by walls designated respectively by the references 88, 89 and 90 and assuming the shape of ellipses when seen in transverse cross-section along a plane at right angles to said axis, the three ellipses considered being such as to intersect from one compartment to the next so as to form a trilobate structure around the tubular element 4. At one of the foci of each of the ellipses is mounted a high-power source of ultraviolet light, these sources which are designated respectively by the references 91, 92 and 93 being locked in position with respect to the ends of the walls 88, 89 and 90 by fastening means such as the members 94, 95 and 96 ; on the other hand, the second foci of the three ellipses coincide along the axis of the tubular element 4. The walls 88, 89 or 90 of the compartments of the enclosure 84 are finally formed of material which is capable of reflecting radiations emanating from the sources, the focal mounting of these latter being such as to permit convergence of all these radiations towards the axis of the tubular element. There then takes place under the action of said radiations the rapid cold polymerization of the impregnation resin progressively as the tubular element 4 passes within the enclosure 84.

However, in order not to cause damage during this operation to the inner sheath and especially to the outer sheath which is located on the path of the radiations, in particular by reason of the inevitable evolution of heat resulting from the polymerization of the resin and from the visible fringes of the ultraviolet radiation itself, the casing 84 is advantageously fitted with a transparent tube 97 which surrounds the tubular element 4 with a substantial clearance and is located coaxially with this latter, said tube 97 being maintained against the walls 88, 89 and 90 by means of tie-braces 98. The central portion of said tube 97 communicates with a duct 99 (shown in FIG. 3), said duct being connected to a high-power fan (not shown) which delivers a high-velocity air-stream into the tube, thereby immediately removing the heat produced. Moreover, said tube 97 protects the sources 91, 92 and 93 from the effects of the air-stream itself. At the outlet of the enclosure 84, the tubular element 4 is finally displaced by the two traction belts 100 and 101 of the station L, a sufficient tractive force being applied to the element to permit this latter to pass continuously out of the installation.

Another alternative arrangement can advantageously be contemplated in regard to the particular arrangement of means which, at the outlet of the head of the extruder which produces the outer sheath (shown in FIG. 8), serve to apply said sheath against the intermediate jacket with a uniform and homogeneous distribution of the binder between the fibers or windings of the reinforcement material which constitutes said jacket as well as means which may be required to effect polymerization of said binder such as those which have just been described in the foregoing.

In FIG. 12, there are again shown the tubular element 4 with its inner sheath, its intermediate jacket and its outer sheath. At the outlet of the extruder, this element is caused to pass through a reservoir 102 constituted by a cylindrical shell 103 which is closed at both ends by end-plates designated respectively by the references 104 and 105 and disposed at right angles to the axis of the tubular element which coincides with the direction of forward motion of said element as this latter is being produced. These end-plates 104 and 105 are provided with central openings 106 and 107 having a diameter which is very slightly greater than that of the tubular element 4 in order to permit the continuous passage of this latter.

Figure 12:
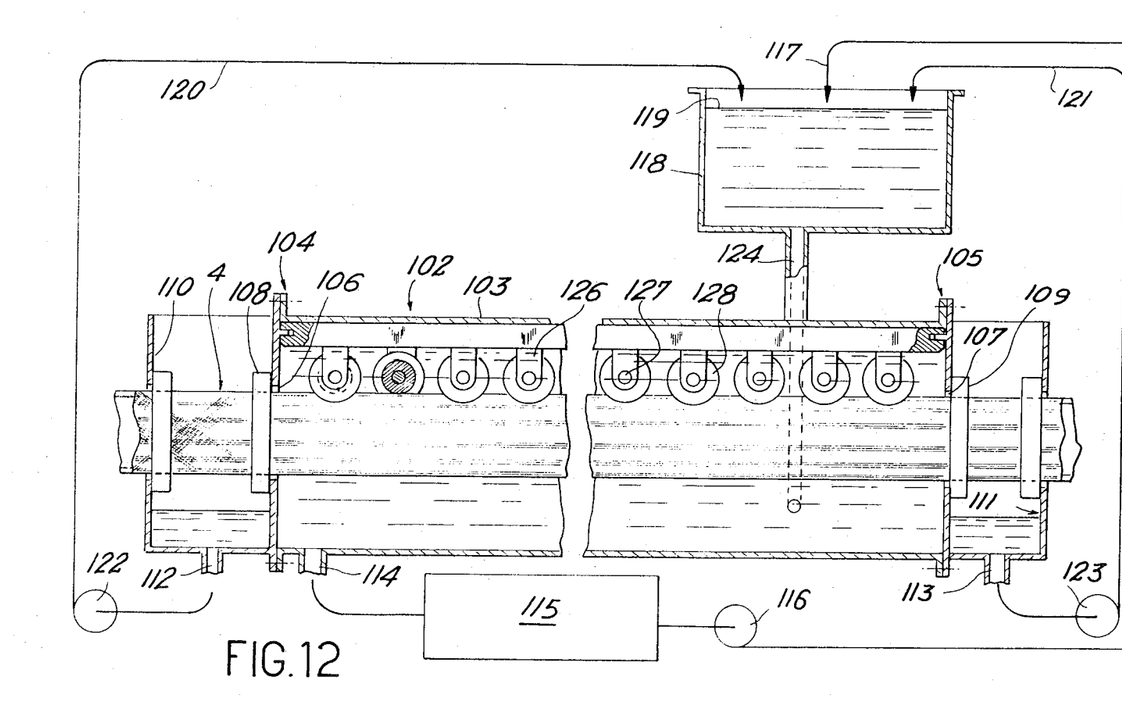
FIG. 12 illustrates another alternative form of construction of the means which permit, after impregnation of the jacket of the inner sheath and simultaneous covering by the outer sheath, the forcible application of said sheath against the jacket and its radial shrinkage.

Since the reservoir 102 is intended to contain a liquid under pressure and especially water which is brought to a controlled temperature, the openings 106 and 107 are associated outside the reservoir and in the vicinity of the end-plates 104 and 105 with two sealing rings 108 and 109. These rings can advantageously be formed in the same manner as the collars 76 which were described earlier (with reference to FIG. 9) in order to cause progressive clamping of the outer sheath against the inner sheath or they can be of a different type. In this case, these sealing rings comprise at least one collar formed by a ring of plastic material which is made flexible by means of slots uniformly spaced over the internal contour of said collar. This ring is traversed axially by the tubular element 4 and is associated with an elastic chamber which applies a distributed radial compressive force to the ring by admission of a suitable pressure of compressed air into said chamber.

In order that inevitable leakage of water from the reservoir through the sealing rings 108 and 109 should nevertheless be recovered progressively as the tubular element advances, the end-plates 104 and 105 are placed in adjacent relation to recovery headers designated respectively by the reference numerals 110 and 111. These headers each have a flat end-plate into which opens a pipe 112 or 113 for the discharge of recovered water. Similarly, the cylindrical shell 103 of the reservoir 102 comprises a duct 114 which is connected to a heating installation of the same kind as a conventional boiler 115 which serves to heat the water of the reservoir to a suitable and regularly controlled temperature. The outlet of the boiler 115 is connected to a circulating pump 116 which returns the water through a pipe 117 to an upper tank 118 which is placed above the reservoir, the level 119 within said tank being maintained at a constant value for measuring the hydrostatic pressure exerted on the tubular element 4 by the water of the reservoir which is connected to the tank 118 by means of the duct 124. The ends of two other pipes, respectively 120 and 121, also open into said tank 118 and are connected to the recovery ducts 112 and 113 of the headers 110 and 111, said pipes 120 and 121 being provided with circulating pumps 122 and 123 for continuously returning leakage water through the rings 108 and 109.

Finally, in order to ensure that the tubular element 4 which is filled with air in the internal portion thereof is not subjected to any harmful bending stress under the pressure of the water within the reservoir, provision is made in the top portion of the reservoir for a longitudinal beam 125 which supports a series of yokes 126 fitted with horizontal pins 127 on which are mounted waisted or so-called "hour-glass" rollers 128. These latter conform substantially to the curvature of the tubular element 4 and are intended to maintain this latter substantially in the axis of the openings 106 and 107 which are provided in the end-plates 104 and 105.

During operation, the hydrostatic pressure of the water contained in the tank on the tubular element applies an evenly distributed force over the entire outer sheath, with the result that the windings or fibers of the reinforcement material constituting the banding jacket which is located between the inner sheath and the outer sheath are impregnated with the thermosetting binder in a uniform and homogeneous manner. The formation of pockets of binder at the bottom portion of the outer sheath is thus made practically impossible whilst the action of the sealing rings provided at the extremities of the reservoir achieve a further improvement in the application of the outer sheath against the intermediate jacket. Finally, it is possible by means of this device to carry out an immediate and accurate adjustment of the temperature of the water contained in the reservoir and consequently to adjust the progressive value of radial shrinkage of the outer sheath onto the jacket and onto the inner sheath at the same time as the polymerization of the binder itself. All these factors permit the manufacture of a tubular element having higher mechanical strength and properties which remain constant at any point of this element.

Whatever form of construction is adopted, there is thus provided a machine of simple design which permits continuous production of tubular elements at a cost price which is appreciably lower than design solutions of the prior art. These tubular elements are of the type described in which an inner sheath associated with an outer sheath ensure leak-tightness of the elements both with respect to the fluid which is circulated within these latter and with respect to the surrounding external medium. At the same time, an intermediate reinforcement endows these elements with high mechanical strength and enables them to withstand high loads or pressures which are applied either internally or externally. As has already been stated, the materials constituting the plastic sheaths, the reinforcement threads or ribbons and the impregnation binder can be of variable nature according to the particular applications of the tubular elements to be fabricated.

Furthermore, since the structure of the machine makes use of a series of successive stations which are in fact separated from each other and each perform one or a number of well-determined specific operations, it is possible to contemplate a number of alternative forms by interposing intermediate stations between the main stations which have been described in the foregoing. There can be carried out in these intermediate stations other complementary operations such as winding or deposition, between the windings of the reinforcement material, of an additional layer consisting of another material such as plastic foam, polystyrene whether expanded or not, polyurethane foam, or alternatively a deposit consisting of a granular material or the like which may or may not be impregnated with a resin.

As has already been brought out by the foregoing, it is readily apparent that the invention is therefore not limited in any sense to the mode of application of the method or to the example of construction of the machine as described in the foregoing and illustrated in the accompanying drawings but extends on the contrary to all alternative forms. In particular, the winding machines for winding the reinforcement material as well as the extruders for the inner sheath and outer sheath could be of different types and permit a large number of modifications without thereby departing from the scope of the invention. The enclosure for polymerization by ultraviolet radiation or the reservoir for circulation of water at variable temperature could also be replaced by other devices which are known per se, especially by a radiofrequency furnace. Finally, instead of being extruded at the head of the machine, the inner sheath could be formed by means of two strips forcibly applied in juxtaposed relation and bonded together longitudinally along their two sides or could alternatively be formed with a sufficient thickness of material to endow the sheath with sufficient inherent rigidity, thereby dispensing with the need for internal inflation of said sheath and avoiding the use of a sealing end-plug.

What I claim is:

1. A continuous production machine for the manufacture of a composite tubular element, comprising successively in the direction of formation of a tubular element from the upstream to the downstream end, means for the continuous manufacture of an inner sheath of plastic material which are associated with a mandrel for giving a tubular shape to said sheath, means for displacing said inner sheath over the mandrel, means for covering the sheath in the dry state with at least one winding of threads or ribbons of reinforcement material, means for impregnating the reinforcement material with a hardenable binder and means for polymerizing said binder which are located downstream of the impregnating means, wherein the impregnating means are constituted by a double-walled tank traversed axially by the inner sheath which is covered with its windings of reinforcement material and comprising an axial cylindrical extension directed towards the upstream end which surrounds the inner sheath coaxially with a clearance space and is provided with a pipe for the admission of the impregnating binder, said tank being mounted at the center and in the axis of an extruder which continuously supplied an outer sheath of plastic material surrounding the inner sheath and its windings of reinforcement material, said machine being provided successively with means for causing elongation of the outer sheath in the hot state which are mounted downstream at the outlet of the extruder in cooperating relation with an axial cylindrical extension of the tank which is directed towards the downstream end and on which the outer sheath slides, means for supporting the outer sheath while causing the radial shrinkage thereof, means for continuing the progressive radial clamping of the outer sheath against the inner sheath and means for completing the uniform distribution and penetration of the impregnating binder through the windings of the reinforcement material.

2. A production machine in accordance with claim 1, wherein the tank is provided within the thickness of its double wall with a fluid-circuit for circulating a coolant, thereby preventing adhesion of the outer sheath to the cylindrical tank extension which is directed towards the downstream end and protecting the binder from heating by the extruder which surrounds said tank.

3. A production machine in accordance with claim 1, wherein the external surface of the cylindrical tank extension which is directed towards the downstream end is provided with a covering formed of material having a low coefficient of friction over which the outer sheath slides.

4. A production machine in accordance with claim 1, wherein the extruder which delivers the outer sheath is of the right-angle head type in which the axis coincides with the axis of the inner sheath.

5. A production machine in accordance with claim 1, wherein the means for causing elongation of the outer sheath at the outlet of the extruder comprise a set of at least two retractable wheels which are capable of clamping the sheath between said wheels and the cylindrical tank extension which is directed towards the downstream end, and a traction belt driven at a speed which is slightly higher than the speed of the wheels.

6. A production machine in accordance with claim 1, wherein the means for supporting the outer sheath while causing the radial shrinkage thereof are constituted by two successive stations for blowing hot air then cold air in order to form air cushions for supporting the sheath, said stations being disposed downstream of the impregnating means and upstream of the polymerization means.

7. A production machine in accordance with claim 1, wherein the means for supporting the outer sheath are constituted by a reservoir which is traversed axially and continuously by the tubular element, said reservoir being filled with a liquid at a controlled temperature which applies a hydrostatic pressure on the moving outer sheath, means being provided for ensuring leak-tightness in the inlet and outlet zones of the tubular element within the reservoir and means for maintaining the pressure and temperature of the liquid at constant values.

8. A production machine in accordance with claim 7, wherein the tubular element is maintained in the axis of the reservoir by means of waisted bearing rollers having horizontal spindles carried by yokes fixed on a longitudinal beam which is mounted at the top portion of the reservoir.

9. A production machine in accordance with claim 1, wherein the supply of the reservoir with filling liquid is carried out by means of an open tank mounted above the reservoir and communicating therewith, the level of liquid within the tank being maintained at a constant value which is dependent on the hydrostatic pressure within the reservoir by means of a circulating pump which returns the liquid in a closed circuit from said reservoir to said tank after passing through a boiler which continuously controls the temperature of said liquid.

10. A production machine in accordance with claim 7, wherein the means for ensuring leak-tightness within the inlet and outlet zones of the tubular element within the reservoir are constituted by expansible rings which clamp the tubular element and are traversed axially by said element.

11. A production machine in accordance with claim 10, wherein the expansible rings are mounted on each side of the reservoir within leakage collection headers each connected to the tank located above the reservoir by means of a pipe comprising a pump.

12. A production machine in accordance with claim 1, wherein the means for progressive clamping of the outer sheath against the inner sheath are constituted by at least one collar formed by a ring of plastic material made flexible by means of slots uniformly spaced around the internal contour of said collar, said ring which is traversed axially by the tubular element being associated with an elastic annular chamber which applies a distributed radial compressive force on the ring under the action of a pressure of compressed air which is admitted into said chamber.

13. A production machine in accordance with claim 12, wherein the means for completing the uniform distribution and penetration of the binder are constituted by further collars disposed downstream of the progressive clamping means.

14. A production machine in accordance with claim 1, wherein the inner sheath is put under pressure of a compressed fluid, leak-tightness at the downstream extremity of the sheath being ensured by means of a sealing plug over the periphery of which said sheath is capable of sliding, wherein said sealing plug comprises a central body in which are formed grooves having the shape of equidistant sectors forming guides for the supports of transverse rollers which are applied against the wall of the sheath under the action of restoring springs housed between each support and the base of the corresponding sector, said rollers each having the shape of an elongated olive which is capable of conforming substantially to the curvature of the wall of the inner sheath.

15. A production machine in accordance with claim 1, wherein the polymerization means for effecting the hardening of the impregnating binder are constituted by an elongated enclosure traversed axially by the tubular element and comprising three adjacent compartments disposed at angular intervals of 120° about the axis of the enclosure, each compartment being provided in transverse section along a plane at right angles to the axis with a profile in the form of an ellipse, one focus of which is occupied by a high-intensity source of ultraviolet light and the other focus of which coincides with the corresponding foci of the other compartments and with the axis of the enclosure, the walls of said compartments being constituted by a material which reflects the light emitted by the sources towards the axis of the tubular element.

16. A production machine in accordance with claim 15, wherein the enclosure is provided axially with a transparent tube surrounding with a substantial clearance the tubular element which passes through the enclosure, said tube being adapted to communicate through a lateral opening of the enclosure with a power fan for delivering in contact with the tubular element an air-stream which removes the heat generated by the reaction of polymerization of the impregnating binder and by the visible fringes of the ultraviolet radiation emanating from the sources which are in turn protected from the air-stream by said tube.

* * * * *